(12) United States Patent
Flickinger et al.

(10) Patent No.: US 8,540,559 B1
(45) Date of Patent: Sep. 24, 2013

(54) COMBINE VARYING DIMENSIONAL VANE THRESHING SYSTEM

(75) Inventors: Wayne T. Flickinger, Oxford, PA (US); Herb M. Farley, Elizabethtown, PA (US); M. Luke Nolt, Leola, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/494,115

(22) Filed: Jun. 12, 2012

(51) Int. Cl.
*A01F 7/06* (2006.01)
*B02B 3/06* (2006.01)

(52) U.S. Cl.
USPC .......................................................... 460/69

(58) Field of Classification Search
USPC ........................................ 460/109, 62, 94, 69
See application file for complete search history.

(56) References Cited

U.S. PATENT DOCUMENTS

| | | | |
|---|---|---|---|
| 2,517,184 A | 8/1950 | Elliott et al. | |
| 3,828,794 A | 8/1974 | Gochanour et al. | |
| 4,139,013 A * | 2/1979 | Hengen | 460/67 |
| 4,244,380 A * | 1/1981 | DePauw et al. | 460/108 |
| RE31,257 E | 5/1983 | Glaser et al. | |
| 4,741,349 A * | 5/1988 | Roderfeld et al. | 460/66 |
| 4,957,467 A * | 9/1990 | Zachary | 460/69 |
| 5,078,646 A * | 1/1992 | Claas et al. | 460/69 |
| 5,334,093 A | 8/1994 | Jensen et al. | |
| 5,816,911 A * | 10/1998 | Dwyer | 460/71 |
| 5,885,155 A * | 3/1999 | Dwyer et al. | 460/72 |
| 6,083,102 A | 7/2000 | Pfeiffer et al. | |
| 6,902,477 B2 | 6/2005 | Braunhardt | |
| 7,473,170 B2 * | 1/2009 | McKee et al. | 460/109 |
| 7,682,236 B2 | 3/2010 | Buermann et al. | |
| 2011/0320087 A1 * | 12/2011 | Farley et al. | 701/29 |

FOREIGN PATENT DOCUMENTS

| | | |
|---|---|---|
| EP | 2055177 A1 | 5/2009 |
| GB | 1399602 A * | 7/1975 |

* cited by examiner

*Primary Examiner* — Árpád Fábián-Kovács
(74) *Attorney, Agent, or Firm* — Patrick M. Sheldrake

(57) ABSTRACT

A cage vane for use with a combine threshing system that includes (i) a mounting leg extending a mounting leg length from a cage vane inner edge to a mounting leg outer surface and a mounting leg thickness from a mounting leg bottom surface to a mounting leg top surface and (ii) a protruding leg extending a protruding leg length from the cage vane inner edge to a protruding leg top surface and a protruding leg thickness from a protruding leg inner surface to a protruding leg outer surface. At least one of the mounting leg length changes as the mounting leg extends the cage vane length, the mounting leg thickness changes as the mounting leg extends the cage vane length, the protruding leg length changes as the protruding leg extends the cage vane length, and the protruding leg thickness changes as the protruding leg extends the cage vane length.

21 Claims, 9 Drawing Sheets

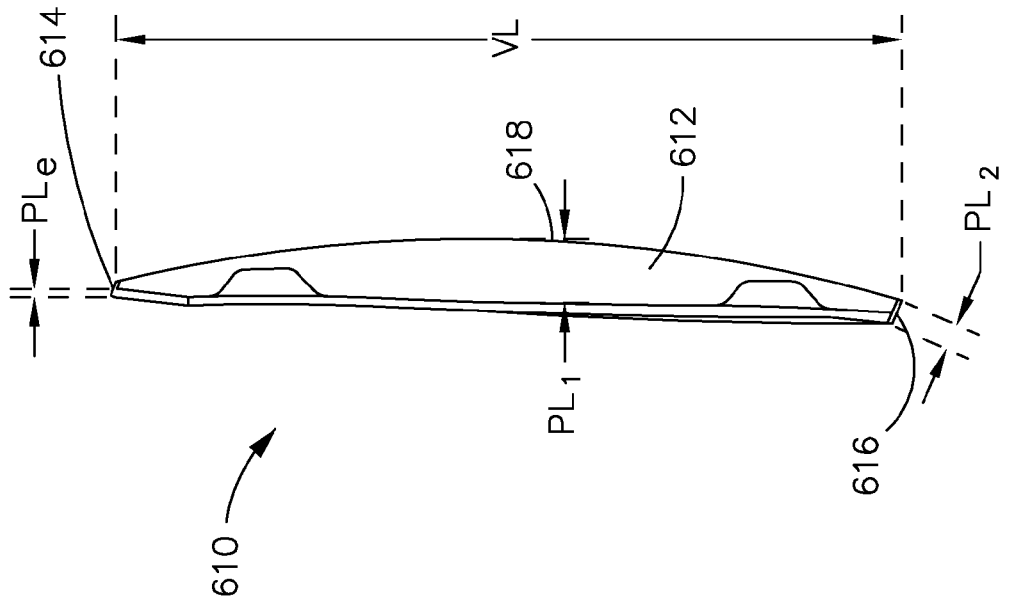
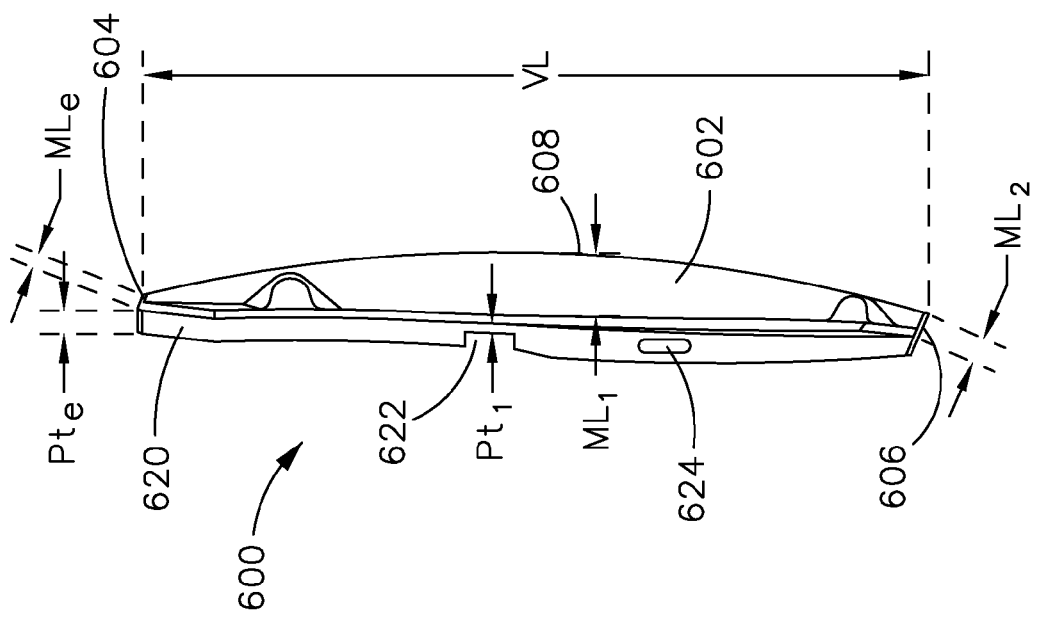

COMBINE VARYING DIMENSIONAL VANE THRESHING SYSTEM

TECHNOLOGY FIELD

The present invention relates generally to harvesters, such as combine harvesters, and more particularly to an improved harvester having a varying dimensional vane threshing system and method for conveying crop material through a varying dimensional vane combine threshing system.

BACKGROUND

A combine harvester is a machine that is used to harvest grain crops. The objective is to complete several processes, which traditionally were distinct, in one pass of the machine over a particular part of the field. Among the grain crops that may be harvested with a combine are wheat, oats, rye, barley, corn, soybeans, flax or linseed, and others. The waste (e.g., material other than grain (MOG)) discharged on the field includes the remaining dried stems and leaves of the crop which may be, for example, chopped and spread on the field as residue or baled for feed and bedding for livestock.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the MOG through the action of the rotor against a cylindrical threshing chamber.

In an axial flow combine, this threshing and separating system serves a primary separation function. The harvested crop is threshed and separated as it is conveyed between a longitudinally arranged rotor and the inner surface of the cylindrical chamber. The cut crop material, or crop mat, spirals and is conveyed along a helical path within the chamber until substantially only larger residue remains. When the residue reaches the end of the threshing drum, it is expelled out of the rear of the combine via a spreader mechanism. Meanwhile, the grain, chaff, and other small debris fall through openings in the threshing chamber onto a cleaning device or shoe, where the grain is further separated from the chaff by way of a winnowing process.

The lower portion or bottom 180 degrees of the cylindrical chamber comprises threshing and separating concaves that may be fitted with steel bars and a meshed grill, through which grain, chaff and smaller debris may fall, whereas the straw, being too big or long, is carried through to the outlet. The upper portion or top 180 degrees of the cylindrical chamber comprises cages that may be fitted with vanes which also aid in separating the grains from the MOG. The dimensions (e.g. length, thickness, angle, etc.) of the vanes control the speed of the crop material conveyed through the chamber, influencing the function of the rotor.

Some conventional cage vanes include fixed helical shaped C-Channels and fixed flat plates. Due to the desire to adjust the performance of the combine to meet varying crop conditions, other conventional vane approaches include L-angle iron vanes which are manually adjustable. The adjustable L-angle iron vanes are constructed of structural angle iron. While the L-angle iron vanes provide some functionality and stability, each leg of the L-angle iron vanes are of constant length and thickness as the legs extend from one edge of the vane to the other edge of the vane. These dimensions and the inherent strength of the structural angle iron vanes make it very difficult to manually adjust the vanes manually in the directions of desired distortion. Accordingly, what is needed is an improved cage vane and cage vane threshing system.

SUMMARY

Embodiments of the present invention are directed to a cage vane for use with a combine threshing system that includes a cage vane inner edge extending a cage vane length from a cage vane front edge to a cage vane rear edge. The cage vane also includes a mounting leg configured to be mounted to a cage portion of a crop material threshing chamber. The mounting leg extends a mounting leg length from the cage vane inner edge to a mounting leg outer surface in a first direction and extends a mounting leg thickness from a mounting leg bottom surface to a mounting leg top surface. The cage vane further includes a protruding leg angled from the mounting leg. The protruding leg extends a protruding leg length from the cage vane inner edge to a protruding leg top surface in a second direction different from the first direction and extends a protruding leg thickness from a protruding leg inner surface to a protruding leg outer surface. At least one of: (i) the mounting leg length is configured to change as the mounting leg extends the cage vane length from a cage vane front edge to the cage vane rear edge; (ii) the mounting leg thickness is configured to change as the mounting leg extends the cage vane length from the cage vane front edge to the cage vane rear edge; (iii) the protruding leg length is configured to change as the protruding leg extends the cage vane length from the cage vane front edge to the cage vane rear edge; and (iv) the protruding leg thickness is configured to change as the protruding leg extends the cage vane length from the cage vane front edge to the cage vane rear edge.

According to one embodiment of the invention, the mounting leg length and the protruding leg length are different lengths at the front edge of the vane. According to another embodiment of the invention, the mounting leg thickness and the protruding leg thickness are different thicknesses at the front edge of the vane.

According to an embodiment, the cage vane further includes at least one boss configured to support a fastener for mounting the cage vane to the cage portion. The at least one boss is disposed between the mounting leg top surface and the protruding leg inner surface.

According to another embodiment of the invention, at least one of: (i) the mounting leg length is further configured to change continuously as the mounting leg extends the cage vane length from the cage vane front edge to the cage vane rear edge; (ii) the mounting leg thickness is further configured to change continuously as the mounting leg extends the cage vane length from the cage vane front edge to the cage vane rear edge; (iii) the protruding leg length is further configured to change continuously as the protruding leg extends the cage vane length from the cage vane front edge to the cage vane rear edge; and (iv) the protruding leg thickness is further configured to change continuously as the protruding leg extends the cage vane length from the cage vane front edge to the cage vane rear edge.

According to an aspect of an embodiment, the mounting leg length is further configured to (i) continuously decrease as the mounting leg extends from the cage vane front edge to a mounting leg intermediate portion between the cage vane front edge and the cage vane rear edge and (ii) continually increase from the mounting leg intermediate portion to the cage vane rear edge. The protruding leg length is further configured to (i) continuously decrease as the protruding leg extends from the cage vane front edge to a protruding leg intermediate portion between the cage vane front edge and the cage vane rear edge and (ii) continually increase from the protruding leg intermediate portion to the cage vane rear edge.

According to one embodiment of the invention, at least one of: (i) the mounting leg length is further configured to change discontinuously as the mounting leg extends the cage vane length from the cage vane front edge to the cage vane rear edge; (ii) the mounting leg thickness is further configured to change discontinuously as the mounting leg extends the cage vane length from the cage vane front edge to the cage vane rear edge; (iii) the protruding leg length is further configured to change discontinuously as the protruding leg extends the cage vane length from the cage vane front edge to the cage vane rear edge; and (iv) the protruding leg thickness is further configured to change discontinuously as the protruding leg extends the cage vane length from the cage vane front edge to the cage vane rear edge.

According to an aspect of an embodiment, at least one of: (i) the mounting leg includes at least one recessed portion, (ii) the protruding leg includes at least one recessed portion; (iii) the mounting leg includes at least one hole, and (iv) the protruding leg includes at least one hole.

Embodiments of the present invention are directed to a combine threshing system that includes a rotor configured to convey material along a helical path from a front end of the rotor to the rear end of the rotor body and a substantially cylindrical threshing chamber having a lower concave portion and an upper cage portion positioned circumferentially around and spaced apart from the rotor. The threshing system also includes a plurality of cage vanes mounted to an inner surface of the cage portion. At least one cage vane of the plurality of cage vanes includes a mounting leg configured to be mounted to a cage portion of a crop material threshing chamber; and a protruding leg. The mounting leg extends a mounting leg length from the protruding leg to a mounting leg outer surface in a first direction and extends a mounting leg thickness from a mounting leg bottom surface to a mounting leg top surface. The protruding leg is angled from the mounting leg and extends a protruding leg length from the mounting leg to a protruding leg top surface in a second direction different from the first direction. The protruding leg also extends a protruding leg thickness from a protruding leg inner surface to a protruding leg outer surface. At least one of: (i) the mounting leg length is configured to change as the mounting leg extends a cage vane length from a cage vane front edge to a cage vane rear edge; (ii) the mounting leg thickness is configured to change as the mounting leg extends the cage vane length from the cage vane front edge to the cage vane rear edge; (iii) the protruding leg length is configured to change as the protruding leg extends the cage vane length from the cage vane front edge to the cage vane rear edge; and (iv) the protruding leg thickness is configured to change as the protruding leg extends the cage vane length from the cage vane front edge to the cage vane rear edge.

According to one embodiment of the invention, the changing mounting leg length and changing mounting leg thickness together include mounting leg varying dimensions. The changing protruding leg length and the changing protruding leg thickness together include protruding leg varying dimensions. The plurality of cage vanes further include a first cage vane having at least one of first mounting leg varying dimensions and first protruding leg varying dimensions. The plurality of cage vanes further include a second cage vane having at least one of second mounting leg varying dimensions different from the first mounting leg varying dimensions and second protruding leg varying dimensions different from the first protruding leg varying dimensions.

According to another embodiment of the invention, the cage portion includes a plurality of slots configured for receiving a fastener to mount the plurality of cage vanes to the cage portion. Each slot has a respective slot area. At least one cage vane of the plurality of cage vanes further includes a mounting portion configured for receiving the fastener and a slot covering portion extending from the mounting portion in substantially opposite directions past the mounting leg outer surface and the protruding leg outer surface. The slot covering portion includes a slot covering portion surface having a covering area greater than a corresponding slot area.

According to one embodiment of the invention, the threshing system further includes a first boss disposed between the mounting leg top surface and the protruding leg inner surface and configured to mount the cage vane to the cage portion. The threshing system further includes a second boss disposed between the mounting leg top surface and the protruding leg inner surface. The second boss is spaced from the first boss along the cage vane length and configured to mount the cage vane to the cage portion.

According to another embodiment of the invention, at least one of: (i) the mounting leg length is further configured to change continuously as the mounting leg extends the cage vane length from the cage vane front edge to the cage vane rear edge; (ii) the mounting leg thickness is further configured to change continuously as the mounting leg extends the cage vane length from the cage vane front edge to the cage vane rear edge; (iii) the protruding leg length is further configured to change continuously as the protruding leg extends the cage vane length from the cage vane front edge to the cage vane rear edge; and (iv) the protruding leg thickness is further configured to change continuously as the protruding leg extends the cage vane length from the cage vane front edge to the cage vane rear edge.

According to an aspect of an embodiment, at least one of the mounting leg length is further configured to (i) continuously decrease as the mounting leg extends from the cage vane front edge to a mounting leg intermediate portion between the cage vane front edge and the cage vane rear edge and (ii) continually increase from the mounting leg intermediate portion to the cage vane rear edge. The protruding leg length is further configured to (i) continuously decrease as the protruding leg extends from the cage vane front edge to a protruding leg intermediate portion between the cage vane front edge and the cage vane rear edge and (ii) continually increase from the protruding leg intermediate portion to the cage vane rear edge.

According to another aspect of an embodiment, the rate of decrease of the mounting leg length is different from the rate of increase of the mounting leg length and the rate of decrease of the protruding leg length is different from the rate of increase of the protruding leg length.

According to one embodiment of the invention, at least one of: (i) the mounting leg length is further configured to change discontinuously as the mounting leg extends the cage vane length from the cage vane front edge to the cage vane rear edge; (ii) the mounting leg thickness is further configured to change discontinuously as the mounting leg extends the cage vane length from the cage vane front edge to the cage vane rear edge; (iii) the protruding leg length is further configured to change discontinuously as the protruding leg extends the cage vane length from the cage vane front edge to the cage vane rear edge; and (iv) the protruding leg thickness is further configured to change discontinuously as the protruding leg extends the cage vane length from the cage vane front edge to the cage vane rear edge.

According to an aspect of an embodiment, at least one of: (i) the mounting leg includes at least one recessed portion; (ii) the protruding leg includes at least one recessed portion; (iii) the mounting leg includes at least one hole, and (iv) the protruding leg includes at least one hole.

According to another embodiment of the invention, the threshing system further includes a cage vane inner edge extending the cage vane length from the cage vane front edge to the cage vane rear edge. The mounting leg extends the mounting leg length from the cage vane inner edge to the mounting leg outer surface in the first direction and the protruding leg extends the protruding leg length from the cage vane inner edge to the protruding leg top surface in the second direction.

Embodiments of the present invention are directed to a method for conveying material in a combine threshing system. The method includes feeding crop material into a substantially cylindrical threshing chamber having a lower concave portion and an upper cage portion positioned circumferentially around and spaced apart from a rotor. The method also includes rotating the rotor to convey the crop material along a helical path through the threshing chamber. the method further includes separating, with at least one cage vane having a mounting leg mounted to an inner surface of the cage portion and a protruding leg, grain from material other than grain by at least one of: (i) separating the grain with a mounting leg having a mounting leg length which changes as the mounting leg extends from a cage vane front edge to a cage vane rear edge; (ii) separating the grain with a mounting leg having a mounting leg thickness which changes as the mounting leg extends from the cage vane front edge to the cage vane rear edge; (iii) separating the grain with a protruding leg having a protruding leg length which changes as the protruding leg extends from a cage vane front edge to a cage vane rear edge; and (iv) separating the grain with a protruding leg having a protruding leg thickness which changes as the protruding leg extends from a cage vane front edge to a cage vane rear edge.

According to an embodiment of the invention, separating the grain with a mounting leg having a mounting leg length further includes separating the grain by continuously changing the mounting leg length as the mounting leg extends from the cage vane front edge to the cage vane rear edge. Separating the grain with a mounting leg having a mounting leg thickness further includes separating the grain by continuously changing the mounting leg thickness as the mounting leg extends from the cage vane front edge to the cage vane rear edge. Separating the grain with a protruding leg having a protruding leg length further includes separating the grain by continuously changing the protruding leg length as the protruding leg extends from the cage vane front edge to the cage vane rear edge. Separating the grain with a protruding leg having a protruding leg thickness further includes separating the grain by continuously changing the protruding leg thickness as the protruding leg extends the cage vane length from the cage vane front edge to the cage vane rear edge.

According to another embodiment of the invention, separating the grain with a mounting leg having a mounting leg length further includes separating the grain by discontinuously changing the mounting leg length as the mounting leg extends from the cage vane front edge to the cage vane rear edge. Separating the grain with a mounting leg having a mounting leg thickness further includes separating the grain by discontinuously changing the mounting leg thickness as the mounting leg extends from the cage vane front edge to the cage vane rear edge. Separating the grain with a protruding leg having a protruding leg length further includes separating the grain by discontinuously changing the protruding leg length as the protruding leg extends from the cage vane front edge to the cage vane rear edge. Separating the grain with a protruding leg having a protruding leg thickness further includes separating the grain by discontinuously changing the protruding leg thickness as the protruding leg extends the cage vane length from the cage vane front edge to the cage vane rear edge.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 6A is a perspective view of an exemplary cage vane illustrating a mounting leg having a mounting leg length which continuously increases and continuously decreases from a cage vane front edge to a cage vane rear edge for use with embodiments of the present invention;

FIG. 6B is a perspective view of an exemplary cage vane illustrating a protruding leg having a protruding leg length which continuously increases and continuously decreases from a cage vane front edge to a cage vane rear edge for use with embodiments of the present invention;

DETAILED DESCRIPTION OF ILLUSTRATED EMBODIMENTS

The present invention is directed to embodiments of a varying dimensional cage vane for use with a combine threshing system and method for conveying crop material through a varying dimensional vane combine threshing system. Embodiments of the present invention provide structural integrity for forces acting on the vane, increase longevity of the vane, optimize functionality of the vane with respect to the vanes interaction with the crop material and provide a desired flexibility of the vane.

Embodiments of the present invention include a cage vane having a mounting leg and a protruding leg, each leg having respective lengths and thicknesses. At least one of the mounting leg length, the mounting leg thickness, the protruding leg length and the protruding leg thickness changes as the mounting leg and protruding leg extend along the cage vane length. Embodiments of the present invention also include a combine threshing system having a plurality of cage vanes mounted to an inner surface of a cage portion of a threshing chamber. At least one cage vane of the plurality of cage vanes varies at least one of the mounting leg length, the mounting leg thickness, the protruding leg length and the protruding leg thickness as the mounting leg and protruding leg extend along the cage vane length.

Figure 1:
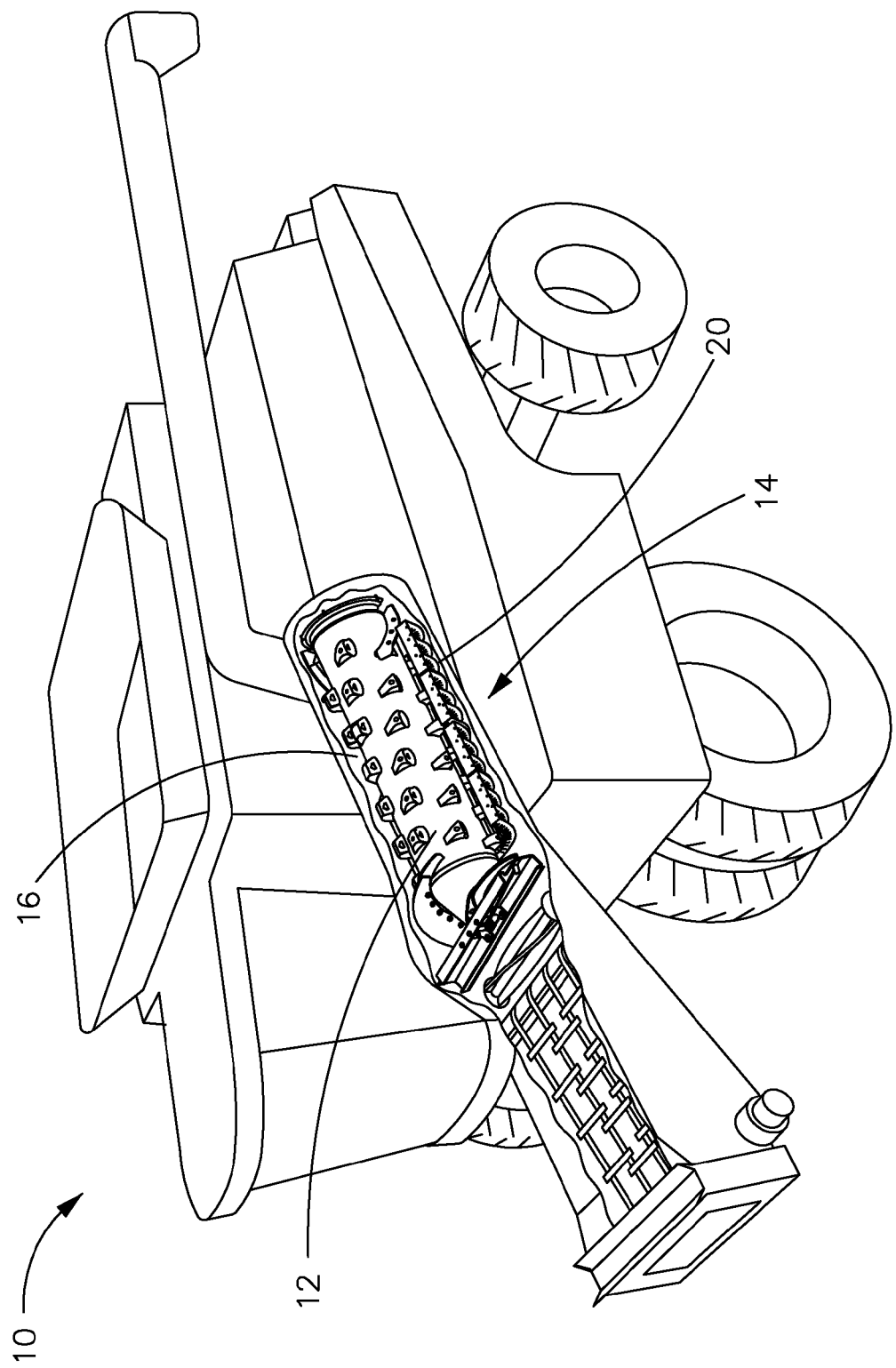
FIG. 1 is a side view of an exemplary agricultural combine for use with embodiments of the present invention.

FIG. 1 shows an exemplary agricultural combine 10 for use with embodiments of the present invention. As shown in FIG. 1, the combine 10 includes a longitudinally axially arranged threshing and separation system 14. The helical bar concave 20, may also be used with combines having transversely aligned threshing and separation system in a combine.

As shown in FIG. 1, threshing and separation system 14 is axially arranged, in that it includes a cylindrical threshing rotor 12 conventionally supported and rotatable in a predetermined direction about a rotational axis therethrough for conveying a flow of crop material in a helical flow path through a threshing chamber 16 extend circumferentially around the rotor 12. As shown, concaves 20 may extend circumferentially around the bottom of the rotor 12 and the flow of crop may pass in the space between the spinning rotor and the concaves. As the crop material flows through the threshing and separation system 14, the crop material including, for example, grain, straw, legumes, and the like, will be loosened and separated from crop residue or waste such as, for example, husks, cobs, pods, and the like, and the separated materials may be carried away from the threshing and separation system 14. As threshed crop falls through the grates in concaves 20, it is moved by a conveyor system to a grain bed in a cleaning system (not shown).

Figure 2:
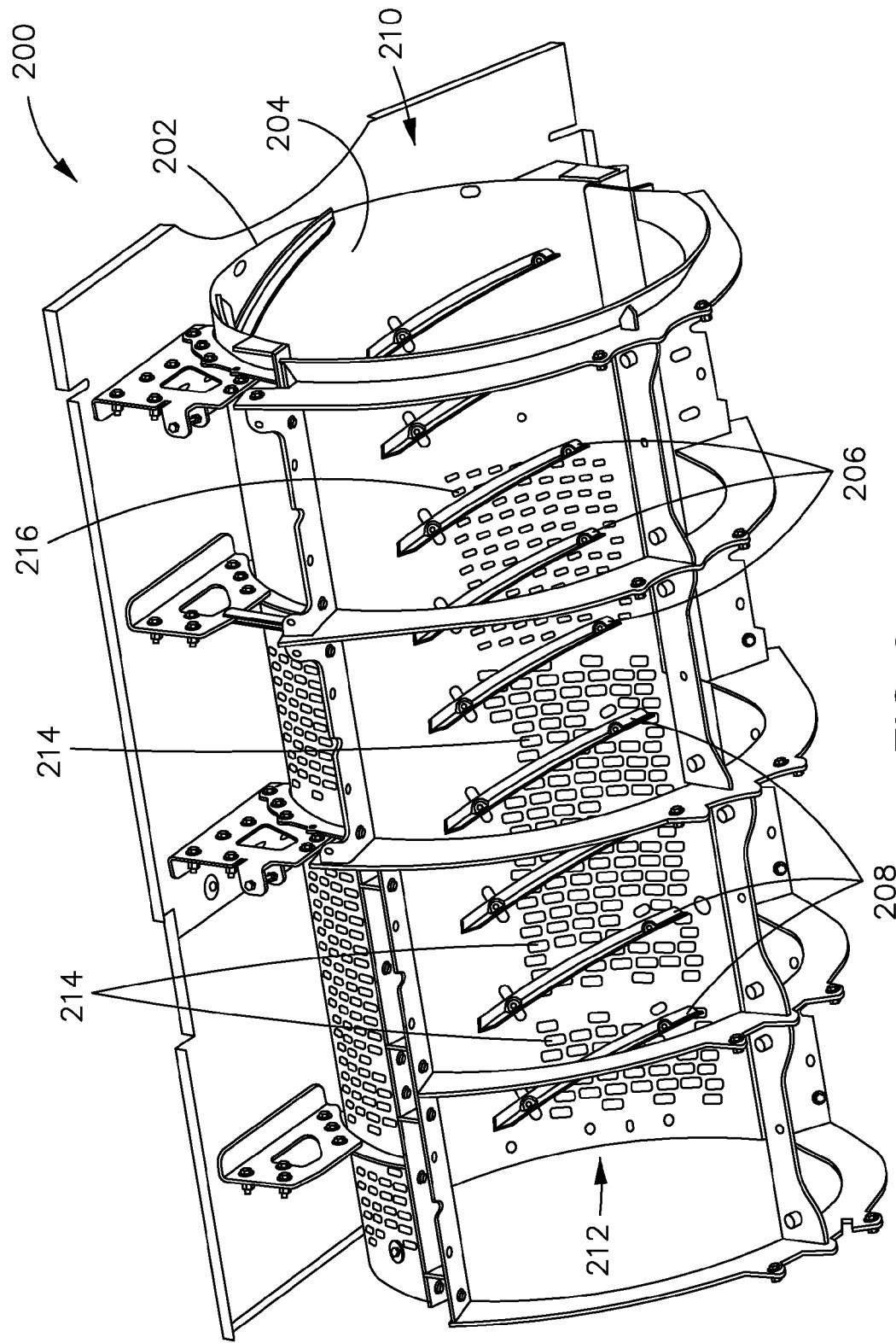
FIG. 2 is a perspective view of an exemplary threshing system illustrating a cage portion on the top threshing chamber having cage vanes of unequal length for use with embodiments of the present invention.

FIG. 2 is a perspective view of an exemplary threshing system 200 illustrating cage portion 204 on the top of crop material threshing chamber 202. The threshed crop may also fall through perforations 214 and 216 in a cage 204 and moved to the cleaning system. Concaves 20 and rotor 12 are not shown in FIG. 2 to better illustrate cage portion 204 and cage vanes 206 and 208. According to some embodiments of the present invention, cage portion 204 may include cage vanes 206 and 208 of unequal length. For example, cage portion 204 includes cage vanes 206 located near front end 210 of threshing chamber 202 and cage vanes 208 located near rear end 212 of threshing chamber 202. As shown, cage vanes 206 have a shorter length than cage vanes 208.

Although FIG. 2 illustrates a first set of cage vanes 206 having one length and another set of cage vanes having another length 208, it is contemplated that exemplary threshing systems may include more than two sets of cage vanes, each having different lengths. In some embodiments, each vane may be of a different length. In other embodiments, each vane may have the same length.

Cage portion 204 may include a single cage or plurality of smaller sub-cages. For example, one sub-cage may include larger perforations 214 and another sub-cage may include smaller perforations 216. One sub-cage may include one or more sets of cage vanes, each set having corresponding lengths. Another sub-cage may include one or more additional sets of cage vanes having different lengths than the vanes on the first sub-cage.

Figure 3:
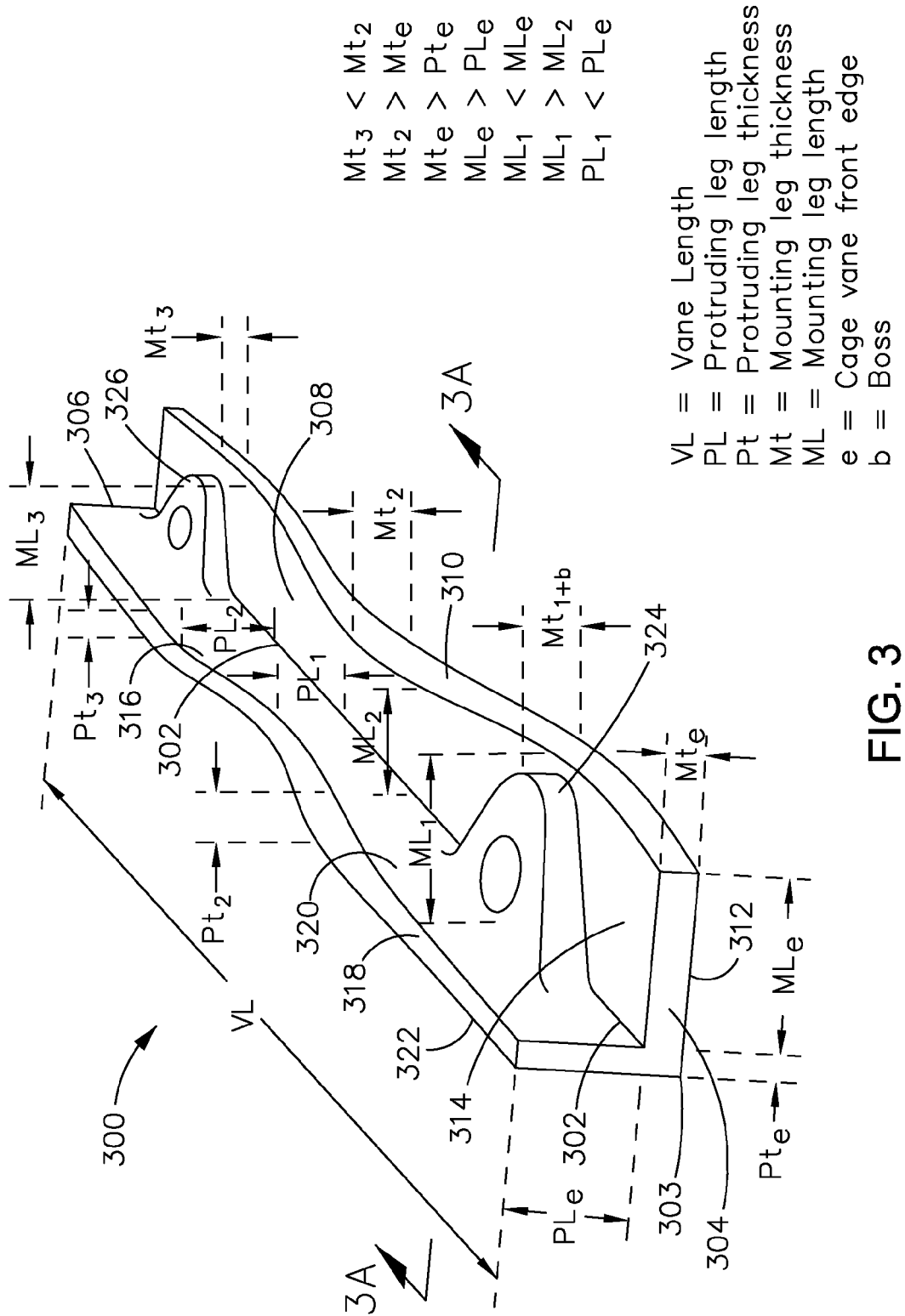
FIG. 3 is a perspective view of an exemplary cage vane illustrating varying dimensions of the cage vane, a mounting leg and a protruding leg for use with embodiments of the present invention.

FIG. 3 is a perspective view of an exemplary cage vane illustrating varying dimensions of the cage vane, a mounting leg and a protruding leg for use with embodiments of the present invention. As shown at FIG. 3, cage vane 300 includes a cage vane inner edge 302 extending a cage vane length VL from a cage vane front edge 304 to a cage vane rear edge 306. Cage vane 300 also includes a mounting leg 308 configured to be mounted to cage portion 204 of threshing chamber 202. In one embodiment, mounting leg 308 may extend a mounting leg length ML from the protruding leg 316 to a mounting leg outer surface 310. According to one aspect of the embodiment, mounting leg 308 may extend the mounting leg length ML from the cage vane inner edge 302 to the mounting leg outer surface 310. Mounting leg 308 also extends a mounting leg thickness $Mt_e$ along the cage vane front edge 304 from a mounting leg bottom surface 312 to a mounting leg top surface 314.

Cage vane 300 further includes a protruding leg 316. In one embodiment, protruding leg 316 may extend a protruding leg length PL from the mounting leg 308 to a protruding leg top surface 318. According to one aspect of the embodiment, protruding leg 316 may extend a protruding leg length PL from the cage vane inner edge 302 to the protruding leg top surface 318. Protruding leg 316 also extends a protruding leg thickness $Pt_e$ along the cage vane front edge 304 from a protruding leg inner surface 320 to a protruding leg outer surface 322.

In the embodiment shown at FIG. 3, cage vane inner edge 302 may be a line extending a cage vane length VL from a cage vane front edge 304 to a cage vane rear edge 306. It is contemplated, however, that an exemplary cage vane inner edge may be an inner surface extending between mounting leg top surface 314 and protruding leg inner surface 320. In the embodiment shown at FIG. 3, the mounting leg length ML may be measured along mounting leg top surface 314 from the cage vane inner edge 302 to a mounting leg outer surface 310. It is contemplated, however, that the mounting leg length ML may be measured along mounting leg bottom surface 312 from cage vane outer edge 303 to mounting leg outer surface 310. The embodiment shown at FIG. 3 also illustrates that the protruding leg length PL may be measured along protruding leg outer surface 320 from the cage vane inner edge 302 to a protruding leg top surface 318. It is contemplated, however, that the protruding leg length PL may be measured along protruding leg outer surface 322 from cage vane outer edge 303 to protruding leg top surface 318.

In the embodiment shown at FIG. 3, protruding leg 316 extends from the mounting leg 308 at an angle of about 45 degrees. It is contemplated, however, that an exemplary protruding leg 316 may extends from an exemplary mounting leg at a different angle.

In some embodiments, the mounting leg length ML may be configured to change as the mounting leg 308 extends the cage vane length VL from the cage vane front edge 304 to the cage vane rear edge 306. For example, as shown at FIG. 3, the mounting leg extends a mounting leg length $ML_e$ at the cage vane front edge 304. The mounting leg length ML of the mounting leg 308 increases from mounting leg length $ML_e$ to mounting leg length $ML_1$ as the mounting leg 308 extends along the cage vane length VL. The mounting leg length ML of the mounting leg 308 then decreases from mounting leg length $ML_1$ to mounting leg length $ML_2$ as the mounting leg 308 continues to extend along the cage vane length VL. The mounting leg length ML of the mounting leg 308 again increases from mounting leg length $ML_2$ to mounting leg length $ML_3$ as the mounting leg 308 continues to extend along the cage vane length VL.

According to some embodiments, the mounting leg thickness Mt may be configured to change as the mounting leg 308 extends the cage vane length VL from the cage vane front edge 304 to the cage vane rear edge 306. For example, as shown at FIG. 3, the mounting leg 308 extends a mounting leg thickness $Mt_e$ at the cage vane front edge 304. The mounting leg thickness Mt of the mounting leg 308 increases from mounting leg thickness Mt to mounting leg thickness $Mt_2$ as the mounting leg 308 extends the cage vane length VL. The mounting leg thickness Mt of the mounting leg 308 then decreases from mounting leg length $Mt_2$ to mounting leg thickness $Mt_3$ as the mounting leg 308 continues to extend along the cage vane length VL.

In some embodiments, the protruding leg length PL may be configured to change as the protruding leg 316 extends the cage vane length VL from the cage vane front edge 304 to the cage vane rear edge 306. For example, as shown at FIG. 3, the protruding leg 316 extends a length $PL_e$ at the cage vane front edge 304. The protruding leg length PL remains constant at a length $PL_e$ as protruding leg 316 extends along the cage vane length VL and then decreases until the protruding leg 316 extends a protruding leg length $PL_1$. The length of the protruding leg 316 then increases from protruding leg length $PL_1$ to protruding leg length $PL_2$ as the protruding leg 316 continues to extend along the cage vane length VL. The protruding leg length PL of the protruding leg 316 again remains constant until it reaches the cage vane rear edge 306.

According to some embodiments, the protruding leg thickness Pt may be configured to change as the protruding leg 316 extends the cage vane length from the cage vane front edge to the cage vane rear edge. For example, as shown at FIG. 3, the protruding leg extends a protruding leg thickness $Pt_e$ at the cage vane front edge 304. The protruding leg thickness Pt of the protruding leg 316 remains constant at a thickness $Pt_e$ as protruding leg 316 and then increases to a protruding leg thickness $Pt_2$ as the protruding leg 316 extends the cage vane length VL. The thickness of the protruding leg 316 then decreases from protruding leg length $Pt_2$ to protruding leg thickness $Pt_3$ as the protruding leg 316 continues to extend the cage vane length VL. The thickness of the protruding leg 316 again remains constant until it reaches cage vane rear edge 306.

The mounting leg length ML and the protruding leg length PL may be different lengths at the front edge of the vane 304. For example, as shown at FIG. 3, the mounting leg length $ML_e$ of mounting leg 308 at the cage vane front edge 304 is greater than the protruding leg length $PL_e$ of protruding leg 316 at the cage vane front edge 304. A mounting leg length of an exemplary mounting leg at the cage vane front edge may also be less than a protruding leg length of an exemplary protruding leg at a cage vane front edge. It is also contemplated that a mounting leg length of an exemplary mounting leg at the cage vane front edge may be equal to a protruding leg length of an exemplary protruding leg at a cage vane front edge.

The mounting leg thickness Mt and the protruding leg thickness Pt may be different thicknesses at the front edge of the vane 304. For example, as shown at FIG. 3, the mounting leg thickness $Mt_e$ of mounting leg 308 at the cage vane front edge 304 is greater than the protruding leg thickness $Pt_e$ of protruding leg 316 at the cage vane front edge 304. A mounting leg thickness of an exemplary mounting leg at the cage vane front edge may also be less than a protruding leg thickness of an exemplary protruding leg at a cage vane front edge. It is also contemplated that a mounting leg thickness of an exemplary mounting leg at the cage vane front edge may be equal to a protruding leg thickness of an exemplary protruding leg at a cage vane front edge.

According to some embodiments of the present invention, a cage vane, such as cage vane 300, may include at least one boss 324, 326 configured to support a fastener (not shown) for mounting the cage vane 300 to the cage portion 204. The at least one boss 324, 326 may be disposed between the mounting leg top surface 314 and the protruding leg inner surface 320. In one aspect of the embodiment illustrated at FIG. 3, cage vane 300 may include a first boss 324 and a second boss 326 spaced from the first boss 324 along the cage vane length VL. Each boss 324, 326 may be configured to support a corresponding fastener (not shown) for mounting the cage vane 300 to the cage portion 204.

Figure 3A:
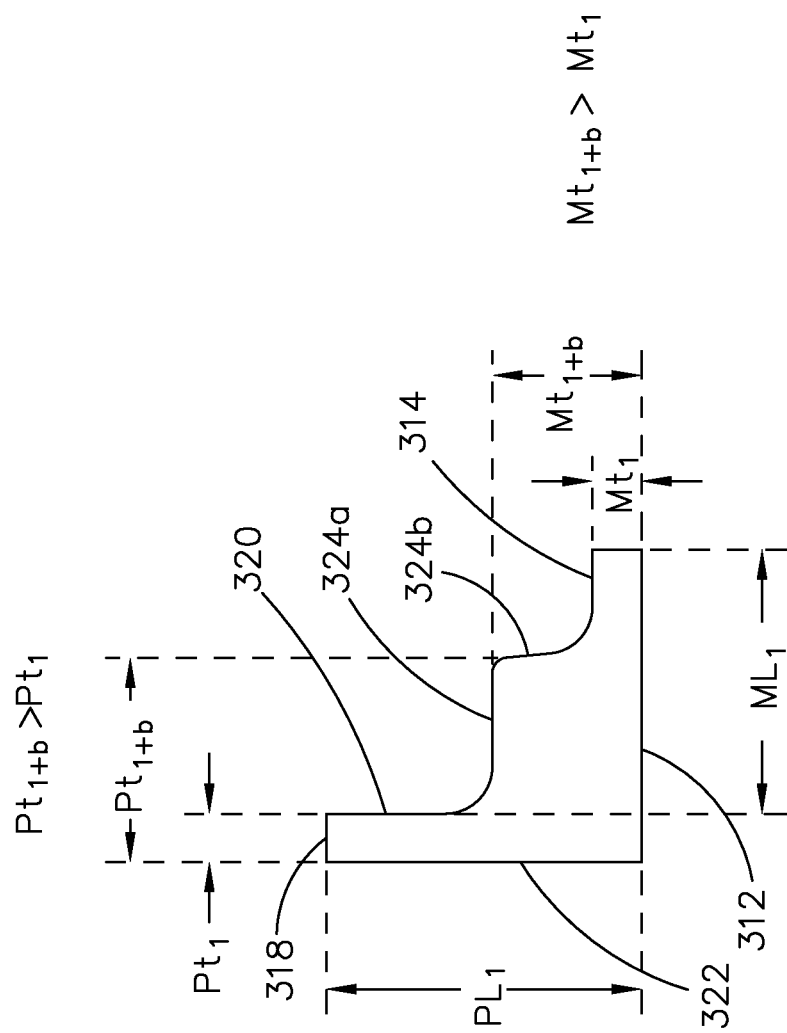
FIG. 3A is a cross sectional view of the cage vane shown at FIG. 3 illustrating varying dimensions of the cage vane across a boss for use with embodiments of the present invention.

FIG. 3A is a cross sectional view of the cage vane 300 illustrating varying dimensions of the cage vane across a portion of the cage vane that includes first boss 324. As shown at FIG. 3, the dimensions of the mounting leg and protruding leg may be non-uniform across the portion of the cage vane that includes first boss 324. For example, a mounting leg thickness Mt across a portion of the first boss 324 may include a mounting leg boss thickness $Mt_{1+b}$ extending from mounting leg bottom surface 312 to boss top surface 324a. Mounting leg thickness Mt across a portion of the first boss 324 may also include a mounting leg thickness $Mt_1$ extending from mounting leg bottom surface 312 to a mounting leg top surface 314. As shown at FIG. 3A, mounting leg boss thickness $Mt_{1+b}$ is greater than the mounting leg thickness $Mt_1$.

Further, a protruding leg thickness Pt across a portion of the first boss 324 may include a protruding leg boss thickness $Pt_{1+b}$ extending from protruding leg outer surface 322 to boss outer surface 324b. Protruding leg thickness Pt across a portion of the first boss 324 may also include a protruding leg thickness $Pt_1$ extending from protruding leg outer surface 322 to protruding leg inner surface 320. As shown at FIG. 3A, protruding leg boss thickness $Pt_{1+b}$ is greater than the protruding leg thickness $Pt_1$.

The varying dimensions of the mounting leg 308 and the protruding leg 316 of cage vane 300 and the location and dimension of bosses 324, 326 shown at FIG. 3 and FIG. 3A are one preferred embodiment. The dimensions may be varied in other ways.

According to some embodiments of the present invention, the thicknesses and lengths of the mounting leg and protruding leg may be configured to change continuously as the mounting leg and protruding leg extends the cage vane length from the cage vane front edge to the cage vane rear edge. For example, the exemplary embodiment shown at FIG. 3 illustrates a mounting leg 308 and a protruding leg 316 having lengths and thicknesses which continuously increase and decrease. FIG. 4 through FIG. 6B show exemplary cage vanes illustrating cage vane dimensions which change continuously along a cage vane length for use with embodiments of the present invention.

Figure 4:
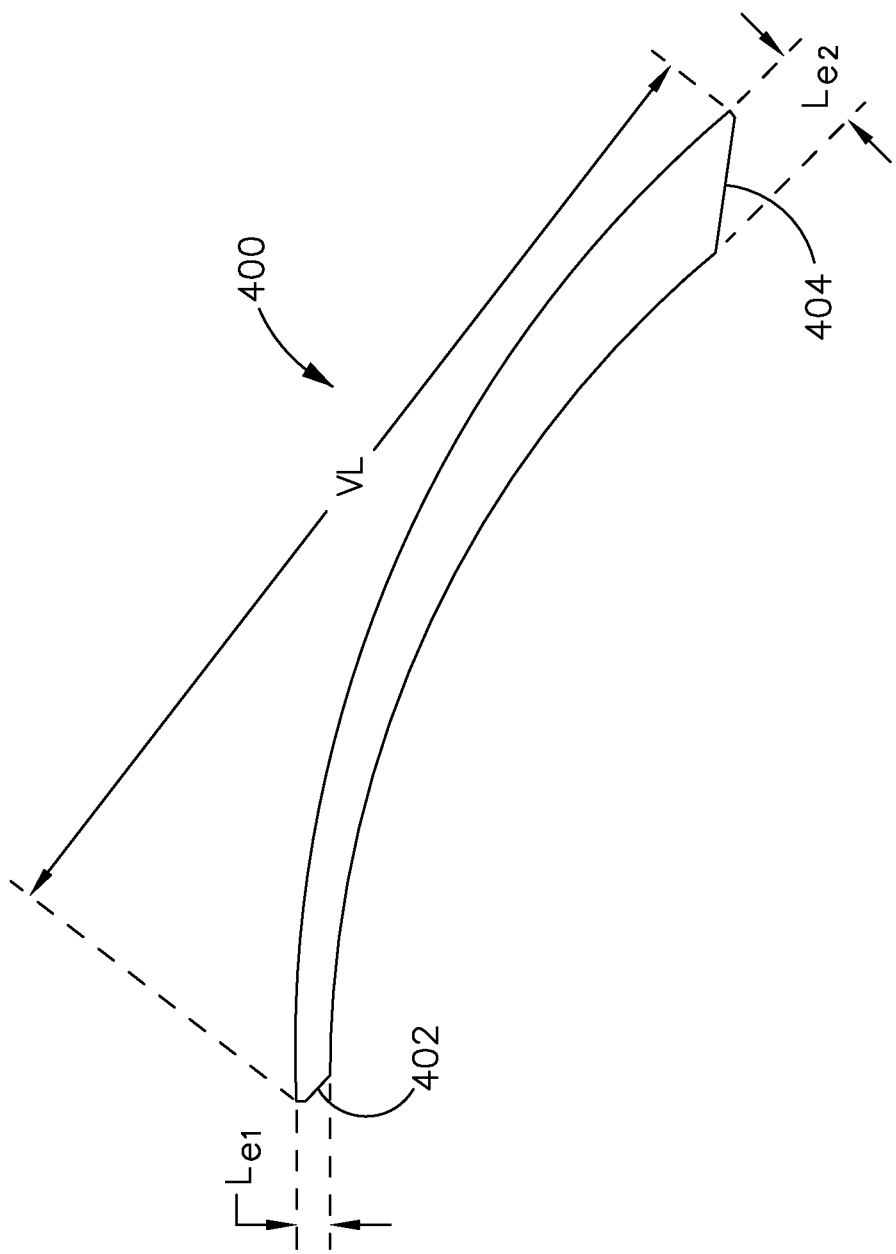
FIG. 4 is a perspective view of an exemplary cage vane leg having a leg length which continuously increases along a cage vane length from a first edge to a second edge for use with embodiments of the present invention.

Although the embodiment shown at FIG. 3 illustrates cage vane legs having leg lengths and leg thicknesses which may both increase and decrease along the cage vane length, in some embodiments, a cage vane mounting leg and/or a protruding leg may include leg lengths and leg thicknesses that (i) increase without decreasing along the cage vane length or (ii) decrease without increasing along the cage vane length. For example, FIG. 4 is a perspective view of a cage vane leg 400 having a leg length L which continuously increases along a cage vane length VL from a first edge 402 to a second edge 404 for use with embodiments of the present invention. Although exemplary cage vanes include a mounting leg and a protruding leg, FIG. 4 shows a single leg for simplification purposes. The cage vane leg 400 shown at FIG. 4 may be a mounting leg or a protruding leg. As shown at FIG. 4, cage vane leg 400 extends a first edge length $L_e$ along the cage vane first outer edge 402. The length L of the cage vane leg 400 continuously increases until it extends a second edge length $L_{e2}$ along the cage vane second outer edge 404. That is, length L of the cage vane leg 400 continuously increases, without decreasing, until it extends a second edge length $L_{e2}$ along the cage vane second outer edge 404. It may also be understood that cage vane leg 400 extends a second edge length $L_{e2}$ along the cage vane second outer edge 404 and the length L of the cage vane leg 400 may continuously decrease, without increasing, until it extends a first edge length $L_{e1}$ along the cage vane first outer edge 402. It is also contemplated that leg thicknesses may continuously increase, without decreasing, from a first cage vane outer edge to a second cage vane outer edge.

Figure 5B:
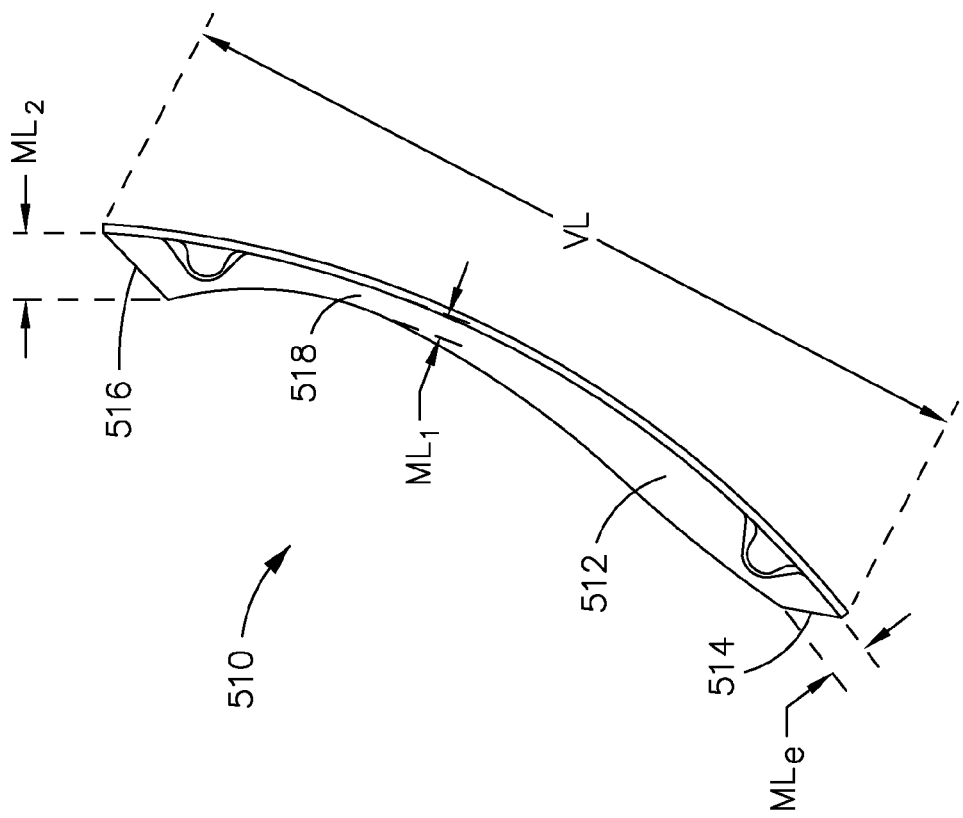
FIG. 5B is a perspective view of an exemplary cage vane illustrating a mounting leg having a mounting leg length which continuously decreases and continuously increases from a cage vane front edge to a cage vane rear edge for use with embodiments of the present invention.
Figure 5A:
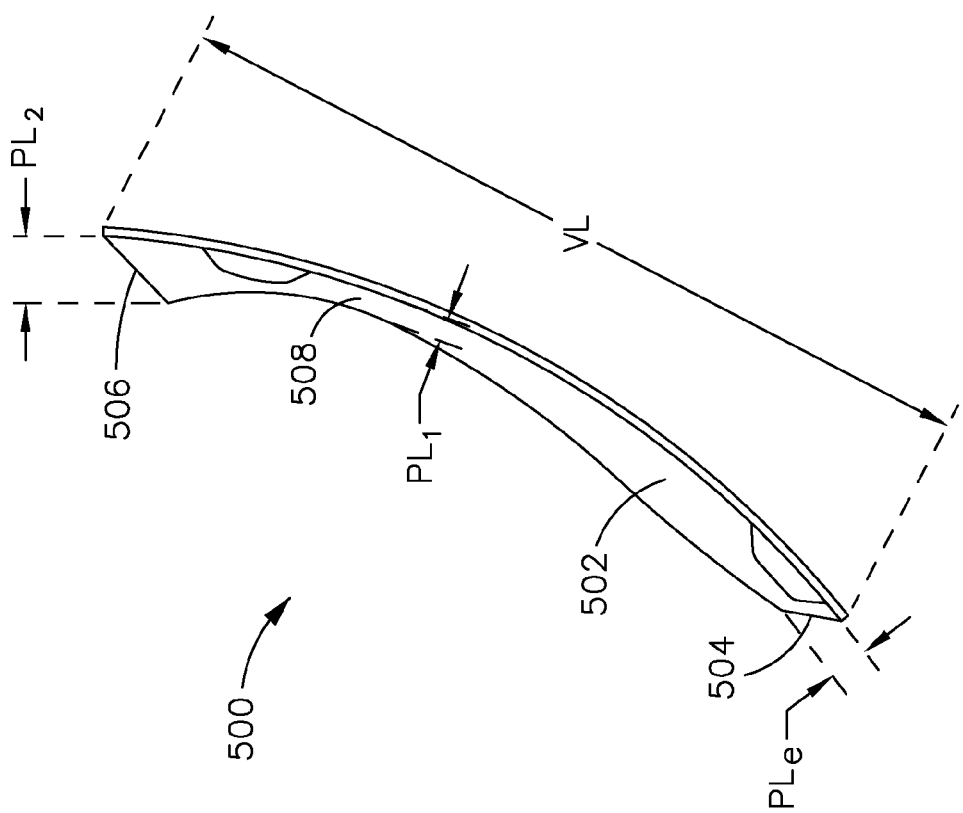
FIG. 5A is a perspective view of an exemplary cage vane illustrating a protruding leg having a protruding leg length which continuously decreases and continuously increases from a cage vane front edge to a cage vane rear edge for use with embodiments of the present invention.

FIG. 5A is a perspective view of an exemplary cage vane 500 illustrating a protruding leg 502 having a length PL which continuously decreases and continuously increases from a cage vane front edge 504 to a cage vane rear edge 506 for use with embodiments of the present invention. As shown at FIG. 5A, the protruding leg 502 extends a length $PL_e$ at the cage vane front edge 504. The protruding leg length PL then decreases along the cage vane length VL until the protruding leg 502 extends a protruding leg length $PL_1$ at the intermediate portion 508. The length of the protruding leg 502 then increases from protruding leg length $PL_1$ to protruding leg length $PL_2$ at the cage vane rear edge 506. Although not shown, it is also contemplated that an exemplary cage vane may include a mounting leg which continuously decreases to an intermediate portion of the mounting leg and then continuously increases to a cage vane rear edge 506.

FIG. 5B is a perspective view of an exemplary cage vane 510 illustrating a mounting leg 512 having a length ML which continuously decreases and continuously increases from a cage vane front edge 514 to a cage vane rear edge 516 for use with embodiments of the present invention. As shown at FIG. 5B, the mounting leg 512 extends a length $ML_e$ at the cage vane front edge 514. The mounting leg length ML then decreases along the cage vane length VL until the mounting leg 512 extends a mounting leg length $ML_1$ at the intermediate portion 518. The length of mounting leg 512 then increases from mounting leg length $ML_1$ to mounting leg length $ML_2$ at the cage vane rear edge 516.

As shown at FIG. 5A and FIG. 5B, the protruding leg length PL and the mounting leg length ML may increase and decrease disproportionately as the protruding leg 502 and mounting leg 512 extend along their respective cage vane lengths VL. That is, the intermediate portions $PL_1$ and $ML_1$ are not centered between their respective cage vane front edges 504, 514 and their respective cage vane rear edges 506, 516 and the rates at which the lengths PL and ML decrease are less than the rates at which the lengths PL and ML increase.

FIG. 6A is a perspective view of an exemplary cage vane 600 illustrating a mounting leg 602 having a length ML which continuously increases from a cage vane front edge 604 to an intermediate portion 608 of the mounting leg and continuously decreases from the intermediate portion 608 of the mounting leg 602 to a cage vane rear edge 606 for use with embodiments of the present invention. As shown at FIG. 6A, the mounting leg 602 extends a length $ML_e$ at the cage vane front edge 604. The mounting leg length ML then increases along the cage vane length VL until the mounting leg 602 extends a mounting leg length $ML_1$ at the intermediate portion 608. The length of mounting leg 602 then decreases from mounting leg length $ML_1$ to mounting leg length $ML_2$ at the cage vane rear edge 606.

FIG. 6B is a perspective view of an exemplary cage vane 610 illustrating a protruding leg 612 having a length PL which continuously increases from a cage vane front edge 614 to an intermediate portion 618 of the protruding leg and continuously decreases from the intermediate portion 618 of the protruding leg 612 to a cage vane rear edge 616 for use with embodiments of the present invention. As shown at FIG. 6B, the protruding leg 612 extends a length $PL_e$ at the cage vane front edge 614. The protruding leg length PL then increases along the cage vane length VL until protruding leg 612 extends a protruding leg length $PL_1$ at the intermediate portion 618. The length of protruding leg 612 then decreases from protruding leg length $ML_1$ to protruding leg length $PL_2$ at the cage vane rear edge 616.

As shown at FIG. 6A and FIG. 6B, the protruding leg length PL and the mounting leg length ML may increase and decrease proportionately as the protruding leg 612 and mounting leg 602 extend along their respective cage vane lengths VL. That is, the intermediate portions $PL_1$ and $ML_1$ are substantially centered between their respective cage vane front edges 614, 604 and their respective cage vane rear edges 616, 606 and the rates at which the lengths PL and ML decrease are substantially the same as the rates at which the lengths PL and ML increase.

Figure 7:
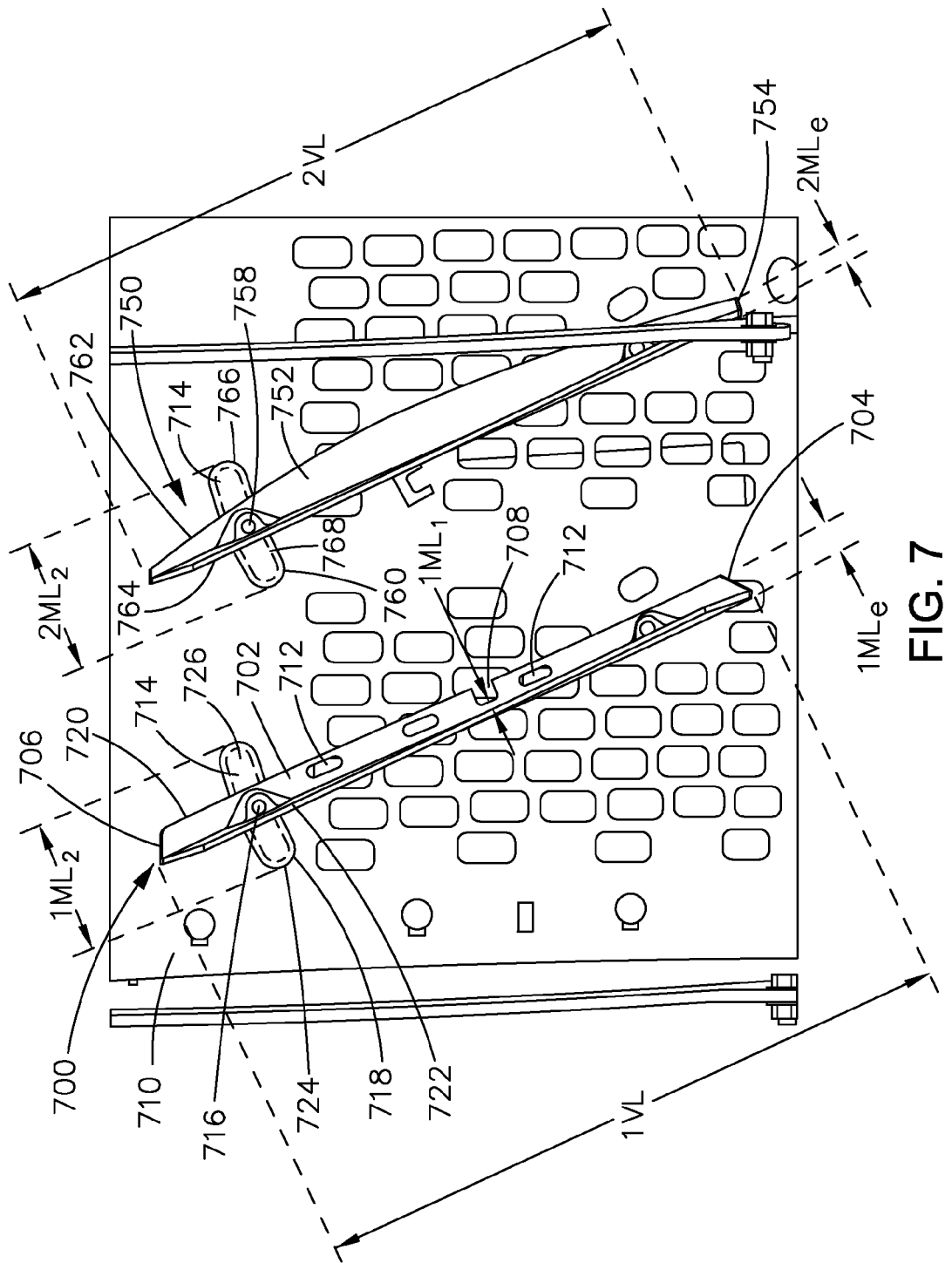
FIG. 7 is a perspective view of a plurality of cage vanes, mounted to a cage portion, illustrating a first cage vane mounting leg length which discontinuously changes and a second cage vane mounting leg length which continuously changes for use with embodiments of the present invention.

According to some embodiments of the present invention, lengths of the cage vane legs may be configured to change discontinuously as they extend the cage vane length from the cage vane front edge to the cage vane rear edge. For example, as shown in FIG. 7, first cage vane 700 includes a first cage vane mounting leg 702 having a first mounting leg length 1Ml which discontinuously decreases and increases along a first cage vane length 1VL from a first cage vane front edge 704 to a first cage vane rear edge 706. Mounting leg 702 includes recessed portion 708 and a plurality of holes 712. As shown, mounting leg 702 extends a first mounting leg length $1ML_e$ at the cage vane front edge 704. The mounting leg length 1ML discontinuously decreases from mounting leg length $1ML_e$ to mounting leg length $1ML_1$ at recessed portion 708.

According to another aspect of the present invention, the thicknesses of the cage vane legs may be configured to change discontinuously as they extend the cage vane length from the cage vane front edge to the cage vane rear edge. For example, referring to FIG. 6A, cage vane 600 includes a protruding leg 620 having a protruding leg thickness Pt which changes discontinuously as the protruding leg 620 extends the cage vane length VL from the cage vane front edge 604 to the cage vane rear edge 606. As shown at FIG. 6A, a protruding leg 620 may also include a recessed portion 622 and a hole 624. Protruding leg 620 extends a protruding leg thickness $Pt_e$ at the cage vane front edge 604. The protruding leg thickness Pt discontinuously decreases from protruding leg thickness $Pt_e$ to protruding leg thickness $Pt_1$ at recessed portion 622.

It is contemplated that an exemplary mounting leg or protruding leg may include any number of holes and/or any number of recessed portions. The locations, sizes and shapes of the recessed portions and holes shown at FIG. 6A and FIG. 7 are one preferred embodiment. It is contemplated that exemplary cage vanes may include recessed portions and holes having different locations, sizes and shapes.

FIG. 7 is a perspective view of a plurality of cage vanes 700, 750, mounted to a cage portion 710. According to some embodiments, the plurality of cage vanes 700, 750 mounted to the cage portion 710 may include a first cage vane 700 having first mounting leg varying dimensions, such as a first mounting leg length 1ML, and a second cage vane 750 having second mounting leg varying dimensions, such as second mounting leg length 2ML, different from the first mounting leg length 1ML. For example, as shown at FIG. 7, mounting leg length 1ML discontinuously decreases from mounting leg length $1ML_e$ to mounting leg length $1ML_1$ at recessed portion 708. Second cage vane 750 includes second cage vane mounting leg 752 having a second mounting leg length 1ML which remains a constant second mounting leg length $2ML_e$ at second cage vane front edge 754 to second mounting leg length $2ML_2$ at second slot covering portion 760.

It is also contemplated that an exemplary first cage vane may include a first mounting leg varying thickness and a second mounting leg may include second mounting leg varying thickness different from the first mounting leg varying thickness. It is contemplated that a first cage vane may include first protruding leg varying dimensions and a second protruding leg may include second protruding leg varying dimensions different from the first protruding leg varying dimensions.

In some embodiments of the present invention, the cage portion 710 may include a plurality of slots 714 configured for receiving a fastener (e.g. bolt, screw and the like) to mount the plurality of cage vanes 700, 750 to the cage portion 710. First cage vane 700 includes a first mounting portion 716 and a first slot covering portion 718 extending from the first mounting portion 716 in substantially opposite directions, past the mounting leg outer surface 720 and the first protruding leg outer surface 722, to a length $1ML_2$. As shown, first slot covering portion 718 includes a first slot covering portion surface 724 having a first slot covering area greater than a corresponding first slot area 726. Second cage vane 750 includes a second mounting portion 758 and a second slot covering portion 760 extending from the second mounting portion 758 in substantially opposite directions, past the second mounting leg outer surface 762 and the second protruding leg outer surface 764, to a length $2ML_2$. As shown, second slot covering portion 760 includes a second slot covering portion surface 766 having a second slot covering area greater than a corresponding second slot area 768.

Figure 8:
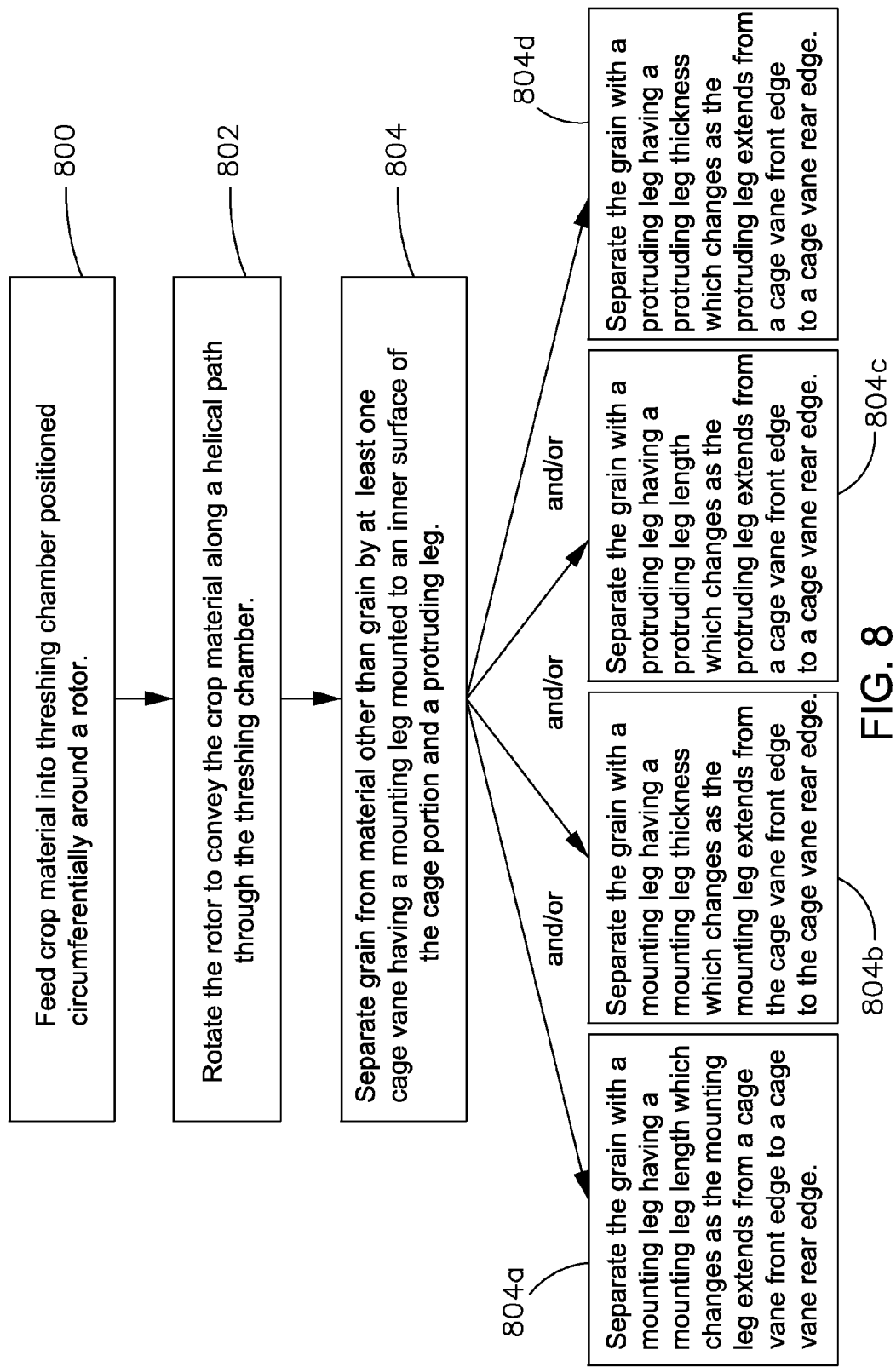
FIG. 8 is a flow chart illustrating an exemplary method for conveying material in a combine threshing system in accordance with an embodiment of the invention.

FIG. 8 is a flow chart illustrating an exemplary method for conveying material in a combine threshing system. At block 800, crop material (not shown) is fed into a substantially cylindrical threshing chamber 202 having a lower concave portion 20 and an upper cage portion 204 positioned circumferentially around and spaced apart from a rotor 12. The exemplary method will be described with reference to FIG. 1 through FIG. 3. At block 802, rotor 12 is rotated to convey the crop material along a helical path through the threshing chamber 202.

At block 804, grain is separated from material other than grain (MOG) with at least one cage vane 214, 300 having a mounting leg 308 mounted to an inner surface of the cage portion 204 and a protruding leg 316. The grain may be separated from the MOG using at least one of the configurations shown at blocks 804a, 804b, 804c and 804d. At block 804a, grain may be separated from the MOG with a mounting leg 308 having a mounting leg length ML which changes as the mounting leg 308 extends from a cage vane front edge 304 to a cage vane rear edge 306. At block 804b, grain may be separated from the MOG with a mounting leg 308 having a mounting leg thickness Mt which changes as the mounting leg 308 extends from the cage vane front edge 304 to the cage vane rear edge 306. At block 804c, grain may be separated from the MOG with a protruding leg 316 having a protruding leg length PL which changes as the protruding leg 316 extends from a cage vane front edge 304 to a cage vane rear edge 306. At block 804d, grain may be separated from the MOG with a protruding leg 316 having a protruding leg thickness Pt which changes as the protruding leg 316 extends from a cage vane front edge 304 to a cage vane rear edge 306.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A cage vane for use with a combine threshing system comprising:
   a cage vane inner edge extending a cage vane length from a cage vane front edge to a cage vane rear edge;
   a mounting leg configured to be mounted to a cage portion of a crop material threshing chamber, the mounting leg (i) extending a mounting leg length from the cage vane inner edge to a mounting leg outer surface in a first direction; and (ii) extending a mounting leg thickness from a mounting leg bottom surface to a mounting leg top surface; and
   a protruding leg (i) angled from the mounting leg; (ii) extending a protruding leg length from the cage vane inner edge to a protruding leg top surface in a second direction different from the first direction; and (iii) extending a protruding leg thickness from a protruding leg inner surface to a protruding leg outer surface, and
   at least one of:
      (i) the mounting leg length is configured to change as the mounting leg extends the cage vane length from a cage vane front edge to the cage vane rear edge;
      (ii) the mounting leg thickness is configured to change as the mounting leg extends the cage vane length from the cage vane front edge to the cage vane rear edge;
      (iii) the protruding leg length is configured to change as the protruding leg extends the cage vane length from the cage vane front edge to the cage vane rear edge; and
      (iv) the protruding leg thickness is configured to change as the protruding leg extends the cage vane length from the cage vane front edge to the cage vane rear edge.

2. The cage vane of claim 1, wherein the mounting leg length and the protruding leg length are different lengths at the front edge of the vane.

3. The cage vane of claim 1, wherein the mounting leg thickness and the protruding leg thickness are different thicknesses at the front edge of the vane.

4. The cage vane of claim 1, further comprising at least one boss configured to support a fastener for mounting the cage vane to the cage portion, the at least one boss disposed between the mounting leg top surface and the protruding leg inner surface.

5. The cage vane of claim 1, wherein at least one of:
(i) the mounting leg length is further configured to change continuously as the mounting leg extends the cage vane length from the cage vane front edge to the cage vane rear edge;
(ii) the mounting leg thickness is further configured to change continuously as the mounting leg extends the cage vane length from the cage vane front edge to the cage vane rear edge;
(iii) the protruding leg length is further configured to change continuously as the protruding leg extends the cage vane length from the cage vane front edge to the cage vane rear edge; and
(iv) the protruding leg thickness is further configured to change continuously as the protruding leg extends the cage vane length from the cage vane front edge to the cage vane rear edge.

6. The cage vane of claim 5, wherein
the mounting leg length is further configured to (i) continuously decrease as the mounting leg extends from the cage vane front edge to a mounting leg intermediate portion between the cage vane front edge and the cage vane rear edge and (ii) continually increase from the mounting leg intermediate portion to the cage vane rear edge; and
the protruding leg length is further configured to (i) continuously decrease as the protruding leg extends from the cage vane front edge to a protruding leg intermediate portion between the cage vane front edge and the cage vane rear edge and (ii) continually increase from the protruding leg intermediate portion to the cage vane rear edge.

7. The cage vane of claim 1, wherein at least one of:
(i) the mounting leg length is further configured to change discontinuously as the mounting leg extends the cage vane length from the cage vane front edge to the cage vane rear edge;
(ii) the mounting leg thickness is further configured to change discontinuously as the mounting leg extends the cage vane length from the cage vane front edge to the cage vane rear edge;
(iii) the protruding leg length is further configured to change discontinuously as the protruding leg extends the cage vane length from the cage vane front edge to the cage vane rear edge; and
(iv) the protruding leg thickness is further configured to change discontinuously as the protruding leg extends the cage vane length from the cage vane front edge to the cage vane rear edge.

8. The cage vane of claim 7, wherein at least one of (i) the mounting leg comprises at least one recessed portion, (ii) the protruding leg comprises at least one recessed portion; (iii) the mounting leg comprises at least one hole, and (iv) the protruding leg comprises at least one hole.

9. A combine threshing system comprising:
a rotor configured to convey material along a helical path from a front end of the rotor to the rear end of the rotor body,
a substantially cylindrical threshing chamber having a lower concave portion and an upper cage portion positioned circumferentially around and spaced apart from the rotor; and
a plurality of cage vanes mounted to an inner surface of the upper cage portion, at least one cage vane of the plurality of cage vanes comprising:
a mounting leg configured to be mounted to the upper cage portion of the threshing chamber; and
a protruding leg,
wherein, the mounting leg (i) extends a mounting leg length from the protruding leg to a mounting leg outer surface in a first direction; and (ii) extends a mounting leg thickness from a mounting leg bottom surface to a mounting leg top surface;
the protruding leg (i) is angled from the mounting leg; (ii) extends a protruding leg length from the mounting leg to a protruding leg top surface in a second direction different from the first direction; and (iii) extends a protruding leg thickness from a protruding leg inner surface to a protruding leg outer surface, and
at least one of:
(i) the mounting leg length is configured to change as the mounting leg extends a cage vane length from a cage vane front edge to a cage vane rear edge;
(ii) the mounting leg thickness is configured to change as the mounting leg extends the cage vane length from the cage vane front edge to the cage vane rear edge;
(iii) the protruding leg length is configured to change as the protruding leg extends the cage vane length from the cage vane front edge to the cage vane rear edge; and
(iv) the protruding leg thickness is configured to change as the protruding leg extends the cage vane length from the cage vane front edge to the cage vane rear edge.

10. The combine threshing system of claim 9, wherein
the changing mounting leg length and changing mounting leg thickness together comprise mounting leg varying dimensions and the changing protruding leg length and the changing protruding leg thickness together comprise protruding leg varying dimensions;
the plurality of cage vanes further comprise:
a first cage vane having at least one of (i) first mounting leg varying dimensions and (ii) first protruding leg varying dimensions, and
a second cage vane having at least one of (i) second mounting leg varying dimensions different from the first mounting leg varying dimensions and (ii) second protruding leg varying dimensions different from the first protruding leg varying dimensions.

11. The combine threshing system of claim 9, wherein
the upper cage portion comprises a plurality of slots configured for receiving a fastener to mount the plurality of cage vanes to the cage portion, each slot having a respective slot area;
at least one cage vane of the plurality of cage vanes further comprises:
a mounting portion configured for receiving the fastener, and
a slot covering portion extending from the mounting portion in substantially opposite directions past the mounting leg outer surface and the protruding leg outer surface and comprising a slot covering portion surface having a covering area greater than a corresponding slot area.

12. The combine threshing system of claim 9, further comprising:
a first boss disposed between the mounting leg top surface and the protruding leg inner surface and configured to mount the cage vane to the upper cage portion; and a second boss disposed between the mounting leg top surface and the protruding leg inner surface, the second boss being spaced from the first boss along the cage vane length and configured to mount the cage vane to the cage portion.

13. The combine threshing system of claim 9, wherein at least one of:
(i) the mounting leg length is further configured to change continuously as the mounting leg extends the cage vane length from the cage vane front edge to the cage vane rear edge;
(ii) the mounting leg thickness is further configured to change continuously as the mounting leg extends the cage vane length from the cage vane front edge to the cage vane rear edge;
(iii) the protruding leg length is further configured to change continuously as the protruding leg extends the cage vane length from the cage vane front edge to the cage vane rear edge; and
(iv) the protruding leg thickness is further configured to change continuously as the protruding leg extends the cage vane length from the cage vane front edge to the cage vane rear edge.

14. The combine threshing system of claim 13, wherein at least one of:
the mounting leg length is further configured to (i) continuously decrease as the mounting leg extends from the cage vane front edge to a mounting leg intermediate portion between the cage vane front edge and the cage vane rear edge and (ii) continually increase from the mounting leg intermediate portion to the cage vane rear edge; and
the protruding leg length is further configured to (i) continuously decrease as the protruding leg extends from the cage vane front edge to a protruding leg intermediate portion between the cage vane front edge and the cage vane rear edge and (ii) continually increase from the protruding leg intermediate portion to the cage vane rear edge.

15. The combine threshing system of claim 14, wherein the rate of decrease of the mounting leg length is different from the rate of increase of the mounting leg length; and
the rate of decrease of the protruding leg length is different from the rate of increase of the protruding leg length.

16. The combine threshing system of claim 9, wherein at least one of:
(i) the mounting leg length is further configured to change discontinuously as the mounting leg extends the cage vane length from the cage vane front edge to the cage vane rear edge;
(ii) the mounting leg thickness is further configured to change discontinuously as the mounting leg extends the cage vane length from the cage vane front edge to the cage vane rear edge;
(iii) the protruding leg length is further configured to change discontinuously as the protruding leg extends the cage vane length from the cage vane front edge to the cage vane rear edge; and
(iv) the protruding leg thickness is further configured to change discontinuously as the protruding leg extends the cage vane length from the cage vane front edge to the cage vane rear edge.

17. The combine threshing system of claim 16, wherein at least one of (i) the mounting leg comprises at least one recessed portion; (ii) the protruding leg comprises at least one recessed portion; (iii) the mounting leg comprises at least one hole, and (iv) the protruding leg comprises at least one hole.

18. The combine threshing system of claim 9, further comprising a cage vane inner edge extending the cage vane length from the cage vane front edge to the cage vane rear edge;
wherein,
the mounting leg extends the mounting leg length from the cage vane inner edge to the mounting leg outer surface in the first direction, and
the protruding leg extends the protruding leg length from the cage vane inner edge to the protruding leg top surface in the second direction.

19. A method for conveying material in a combine threshing system comprising:
feeding crop material into a substantially cylindrical threshing chamber having a lower concave portion and an upper cage portion positioned circumferentially around and spaced apart from a rotor;
rotating the rotor to convey the crop material along a helical path through the threshing chamber; and
separating, with at least one cage vane having a mounting leg mounted to an inner surface of the upper cage portion and a protruding leg, grain from material other than grain by at least one of:
(i) separating the grain with a mounting leg having a mounting leg length which changes as the mounting leg extends from a cage vane front edge to a cage vane rear edge;
(ii) separating the grain with a mounting leg having a mounting leg thickness which changes as the mounting leg extends from the cage vane front edge to the cage vane rear edge;
(iii) separating the grain with a protruding leg having a protruding leg length which changes as the protruding leg extends from a cage vane front edge to a cage vane rear edge; and
(iv) separating the grain with a protruding leg having a protruding leg thickness which changes as the protruding leg extends from a cage vane front edge to a cage vane rear edge.

20. The method of claim 19, wherein
(i) separating the grain with a mounting leg having a mounting leg length further comprises separating the grain by continuously changing the mounting leg length as the mounting leg extends from the cage vane front edge to the cage vane rear edge;
(ii) separating the grain with a mounting leg having a mounting leg thickness further comprises separating the grain by continuously changing the mounting leg thickness as the mounting leg extends from the cage vane front edge to the cage vane rear edge;
(iii) separating the grain with a protruding leg having a protruding leg length further comprises separating the grain by continuously changing the protruding leg length as the protruding leg extends from the cage vane front edge to the cage vane rear edge; and
(iv) separating the grain with a protruding leg having a protruding leg thickness further comprises separating the grain by continuously changing the protruding leg thickness as the protruding leg extends the cage vane length from the cage vane front edge to the cage vane rear edge.

21. The method of claim 19, wherein:
(i) separating the grain with a mounting leg having a mounting leg length further comprises separating the grain by discontinuously changing the mounting leg length as the mounting leg extends from the cage vane front edge to the cage vane rear edge;

(ii) separating the grain with a mounting leg having a mounting leg thickness further comprises separating the grain by discontinuously changing the mounting leg thickness as the mounting leg extends from the cage vane front edge to the cage vane rear edge;
(iii) separating the grain with a protruding leg having a protruding leg length further comprises separating the grain by discontinuously changing the protruding leg length as the protruding leg extends from the cage vane front edge to the cage vane rear edge; and
(iv) separating the grain with a protruding leg having a protruding leg thickness further comprises separating the grain by discontinuously changing the protruding leg thickness as the protruding leg extends the cage vane length from the cage vane front edge to the cage vane rear edge.

* * * * *